(12) United States Patent
Marks et al.

(10) Patent No.: US 10,683,105 B2
(45) Date of Patent: Jun. 16, 2020

(54) RAM AIR TURBINE HEALTH MONITORING SYSTEM

(71) Applicant: HAMILTON SUNDSTRAND CORPORATION, Charlotte, NC (US)

(72) Inventors: Scott J. Marks, Oregon, IL (US); Michael E. Larson, Jr., Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 590 days.

(21) Appl. No.: 15/007,290

(22) Filed: Jan. 27, 2016

(65) Prior Publication Data
US 2017/0210490 A1    Jul. 27, 2017

(51) Int. Cl.
| | |
|---|---|
| *B64F 5/60* | (2017.01) |
| *B64D 41/00* | (2006.01) |
| *F03D 7/02* | (2006.01) |
| *F03D 13/30* | (2016.01) |
| *F03D 7/04* | (2006.01) |
| *F03D 17/00* | (2016.01) |
| *F03D 80/50* | (2016.01) |
| *F03D 80/70* | (2016.01) |
| *F03D 80/80* | (2016.01) |
| *F01D 21/00* | (2006.01) |
| *B64D 45/00* | (2006.01) |

(52) U.S. Cl.
CPC .............. *B64F 5/60* (2017.01); *B64D 41/007* (2013.01); *F01D 21/003* (2013.01); *F03D 7/0264* (2013.01); *F03D 7/042* (2013.01); *F03D 13/30* (2016.05); *F03D 17/00* (2016.05); *F03D 80/50* (2016.05); *F03D 80/70* (2016.05); *F03D 80/82* (2016.05); *B64D 2045/0085* (2013.01)

(58) Field of Classification Search
CPC . B64D 41/007; B64D 2045/0085; B64F 5/60; F01D 21/003; F03D 7/0264; F03D 7/042; F03D 13/30; F03D 17/00; F03D 80/50; F03D 80/70; F03D 80/82
See application file for complete search history.

(56) References Cited

U.S. PATENT DOCUMENTS

| | | | |
|---|---|---|---|
| 7,708,527 B2 * | 5/2010 | Eccles ................. | B64D 41/007 416/170 R |
| 8,201,662 B2 | 6/2012 | Delaloye et al. | |
| 8,577,509 B2 * | 11/2013 | Ong ..................... | F03D 7/0292 700/287 |

(Continued)

FOREIGN PATENT DOCUMENTS

JP        07054762 A  *  2/1995

*Primary Examiner* — Aaron R Eastman
*Assistant Examiner* — Adam W Brown
(74) *Attorney, Agent, or Firm* — Carlson, Gaskey & Olds, P.C.

(57) ABSTRACT

A ram air turbine has a turbine having blades to be extended into an airflow adjacent to an aircraft. The turbine is operable to drive a power generation rotor. A module receives sensed information from a plurality of sensors. The plurality of sensors are associated with locations on the ram air turbine, sense conditions at the locations, and send information with regard to the sensed conditions to the module. The module is operable to compare sensed conditions to limits and identify a potential condition of concern based upon the comparison. A method of testing a ram air turbine is also disclosed.

15 Claims, 3 Drawing Sheets

(56) References Cited

U.S. PATENT DOCUMENTS

| | | | |
|---|---|---|---|
| 8,855,952 B2 | 10/2014 | Spierling | |
| 8,866,324 B2 * | 10/2014 | Ha | H02P 5/00 |
| | | | 290/44 |
| 2011/0127109 A1 * | 6/2011 | Teichert | F03D 80/50 |
| | | | 182/19 |
| 2012/0328436 A1 * | 12/2012 | Soidel | B64D 41/007 |
| | | | 416/47 |

* cited by examiner

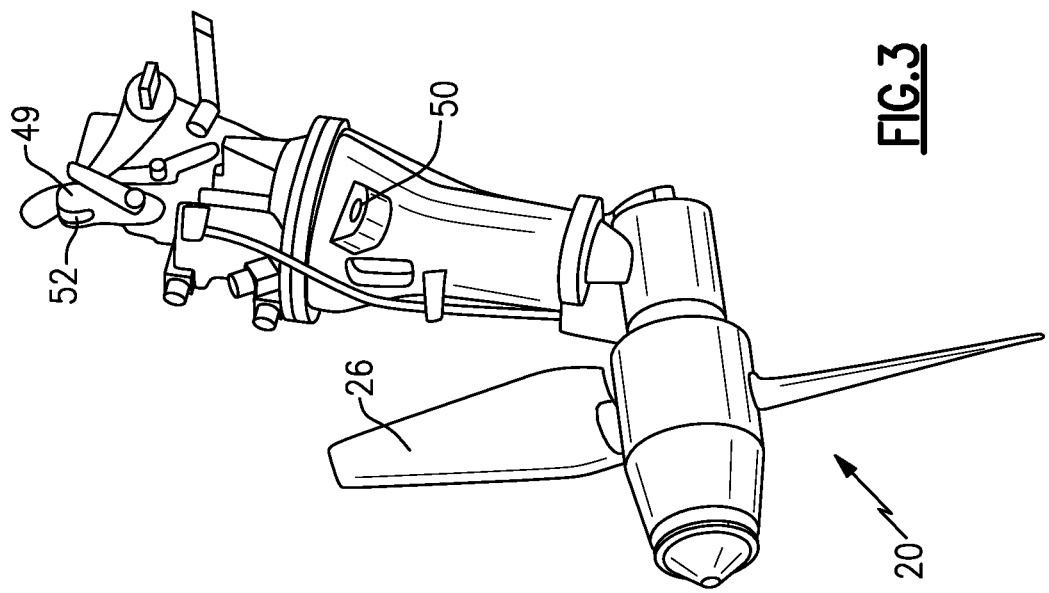
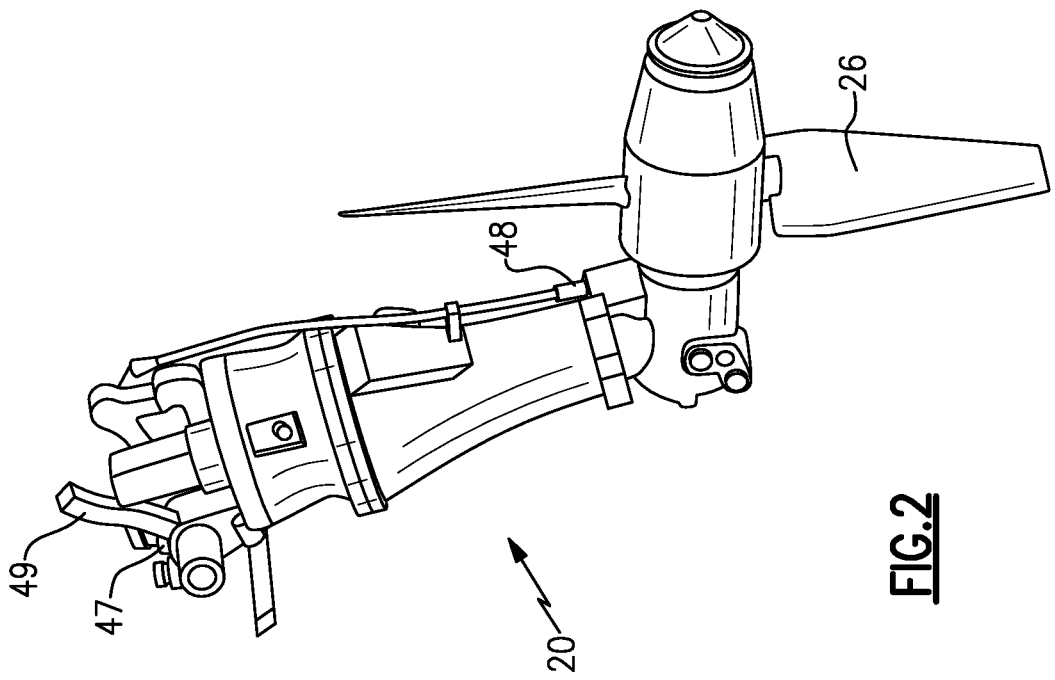

RAM AIR TURBINE HEALTH MONITORING SYSTEM

BACKGROUND OF THE INVENTION

This application relates to a system for monitoring the operation of a ram air turbine.

A ram air turbine ("RAT") is a component incorporated into an aircraft. The RAT is generally stowed within an aircraft body. A RAT includes a turbine which may be driven by airflow to rotate and cause rotation of an associated power generation rotor. In one application, the power generation rotor is an electric generator rotor adjacent a stator. In this way, electricity is generated. In another application, the power generation rotor is a hydraulic pump rotor.

The generated electricity may be utilized to provide electric power to critical components on an aircraft. In the hydraulic pump application, the hydraulic fluid powers critical components.

The RAT is typically moved from the stowed position to an extended position at which it extends outwardly of an aircraft body when an engine, or engines, associated with the aircraft fail. As can be appreciated, the great bulk of RATs are never utilized to perform this function as air travel is extremely safe.

However, when it is necessary for a RAT to operate, it is important that it be functional. As such, periodic testing of RATs is recommended.

To date, RAT manufacturers have set testing to be performed periodically. The period between tests is selected to be conservative and, thus perhaps more frequent than needed.

Typically, the test interval is between 12 and 24 months. The current test may be ground based with the turbine blades driven through some external motor. Alternatively, it is also known to test the RAT by deploying the system in flight.

The current tests thus present a cost and schedule burden to airlines.

Currently, a limited amount of data is collected during the test. As an example, typical collected data would be turbine speed, generator frequency, line contactor closure status, and the amount of power supplied from the generator.

SUMMARY OF THE INVENTION

A ram air turbine has a turbine having blades to be extended into an airflow adjacent to an aircraft. The turbine is operable to drive a power generation rotor. A module receives sensed information from a plurality of sensors. The plurality of sensors are associated with locations on the ram air turbine, sense conditions at the locations, and send information with regard to the sensed conditions to the module. The module is operable to compare sensed conditions to limits and identify a potential condition of concern based upon the comparison.

These and other features may be best understood from the following drawings and specification.

BRIEF DESCRIPTION OF THE DRAWINGS

FIG. 2 shows an external view of a ram air turbine.
FIG. 3 is another external view.

DETAILED DESCRIPTION

Figures 1A, 1B:
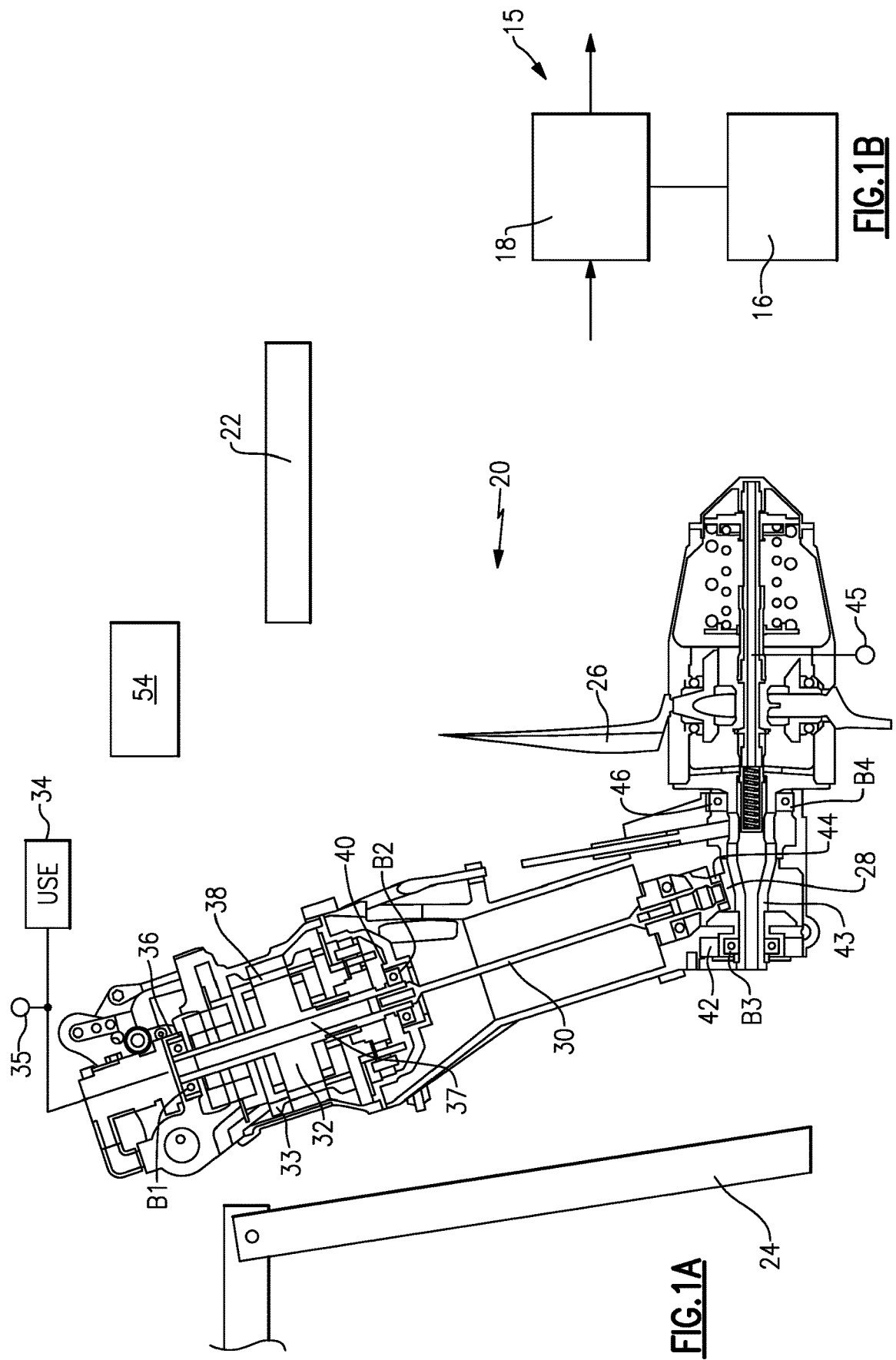
FIG. 1A shows a ram air turbine in cross-section.
FIG. 1B shows an alternative.

FIG. 1A shows a ram air turbine ("RAT") 20 deployed from an aircraft fuselage or wing 22, which includes a pivoting door 24 which may move to an open position to allow the ram air turbine 20 to be deployed. The deployment of the RAT is as known and typically requires an actuator driving the ram air turbine outwardly.

In the deployed position, turbine blades 26 (shown partially in FIG. 1A) are driven to rotate as the aircraft continues to move through the air. The blades 26 drive a turbine shaft 43 and a gear 28 drives a shaft 30 to drive a generator rotor 32 adjacent to a stator 33 to, in turn, generate electricity which may be supplied to a use 34.

The use 34 may be any use of electricity on an aircraft. One common use is to power a hydraulic pump. However, the power may also be utilized for various other flight critical systems on the aircraft. In an embodiment 15, shown schematically in FIG. 1B, a turbine rotor 16 drives a pump rotor 18. Pump rotor 18 may move hydraulic fluid for flight critical systems.

In this disclosure, the term "power generation rotor" could be an electric generator rotor, a pump rotor, or some other rotor.

The RAT is typically moved to the deployed position should there be a failure of aircraft engines or other need to generate emergency power.

A health monitoring module 54 is associated with a plurality of thermocouples which sense the heat at critical locations. As an example, a thermocouple 36 is positioned near an outer bearing B1, which mounts a generator shaft 37. Another thermocouple 38 is adjacent the rotor 32. Further, a thermocouple 40 is positioned by an inner bearing B2 which also mounts the turbine shaft 37.

In an embodiment driving a pump rotor, locations similar to 36/38/40 may be utilized.

Another thermocouple 42 is positioned near a bearing B3 which mounts a turbine shaft 43. A further thermocouple 44 is positioned near a gear interface 28 between the turbine shaft 43 and an output shaft 30. A further thermocouple 46 is positioned adjacent a bearing B4 at an inner location on the shaft 43.

The thermocouples sense the temperature at these strategic locations. As can bae appreciated, if the temperatures sensed by any of the thermocouples are higher than a predetermined limit, this would be indicative of a potential maintenance issue at the associated location. The thermocouples communicate sensed conditions to module 54 where the sensed condition is compared to limits.

A sensor 35 is illustrated, and may sense the amount of power delivered to the use 34. In the embodiment driving a pump, it may sense a fluid volume. A further sensor 45 may sense the speed of the turbines, and also the time of operation.

FIG. 2 shows the location of accelerometers 47 and 48. Accelerometer 47 is mounted near a location 49 that is associated with a mount to the aircraft. This location will monitor the RAT induced vibration levels to the aircraft. Accelerometer 48 is positioned adjacent to the turbine. This location will monitor the primary self-induced vibration associated by the turbine operation. Additional accelerometers may be positioned in other locations as warranted by the design. They are not limited to these locations only.

The accelerometers monitor vibration levels. As can be appreciated, if the vibration level sensed by either accelerometer 47 or 48 is unduly high, this could be indicative of a potential failure of a connection at the sensed location.

FIG. 3 shows the location of strain gauges, which may be utilized at location 50 and 52. Location 50 is associated with a connection to a door linkage that couples the RAT to the RAT bay door on the aircraft. The strain gauge will provide door loads experienced during RAT deployment and operation under the aircraft flight conditions. Location 52 is associated with a connection to an actuator connection 49. The actuator is used to deploy and stow the RAT. The strain gauge at this location will provide deployment loads associated with the actuator. Additional strain gauges may be positioned in other locations as warranted by the design. They are not limited to these locations only.

By monitoring the strain levels, a determination is made indicative of the potential health condition of those connections.

The accelerometers and the strain gauges also communicate with the module 54, and the sensed conditions are also compared to limits at the module 54.

While example locations for the thermocouples, accelerometers and strain gauges are shown, other locations may be utilized.

Figure 4:
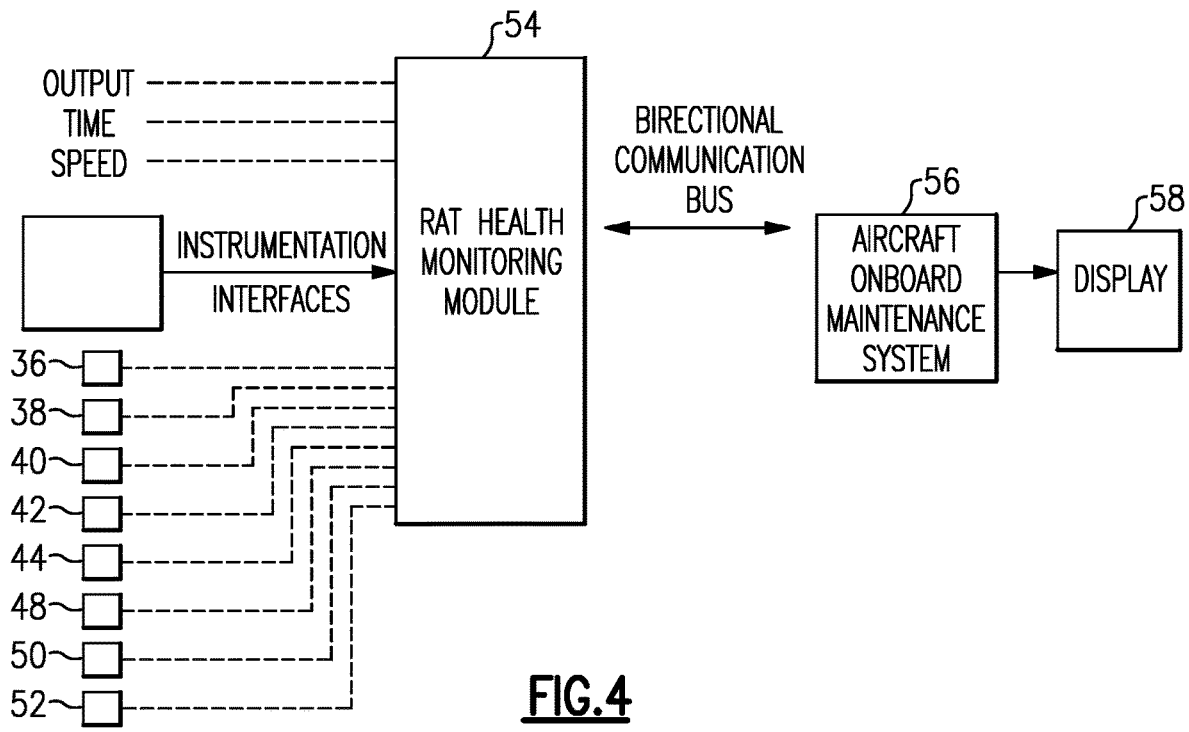
FIG. 4 shows a schematic of a monitoring module and associated sensors.

During a test, a ram air turbine health monitoring module 54, as shown in FIG. 4, receives input information about conditions sensed from sensors 36, 38, 40, 42, 44, 46, 47, 48, 50, and 52. In addition, the power output of the generator, the time of operation, and the speed of the turbine are also all sensed and sent to the module 54.

In addition, the aircraft maintenance system 56 may send relevant aircraft operational parameters, such as air speed, altitude, temperature, etc. to the module 54.

The module 54 is capable of storing each of the sensed conditions. In addition, the module 54 is provided with appropriate software such that it can compare each of the sensed conditions to a predetermined limit. Should any of the sensed conditions be beyond an associated limit, this may be indicative of a potential problem. A signal may be sent to the aircraft maintenance system 56 and/or to a display 58.

Figure 5:
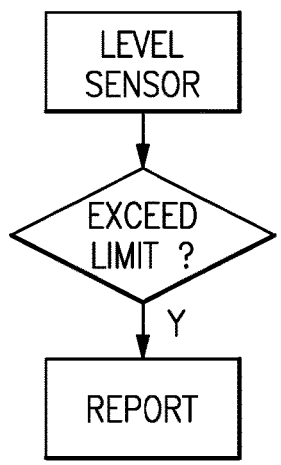
FIG. 5 is a flow chart.

As shown in FIG. 5, each sensed level is compared to a limit. If the limit is exceeded, then a report is made such as displaying a potential problem on the display 58.

Thus, the pilot or maintenance personnel may be provided with information about the potential failure of any one of the components or locations associated with the several sensors.

The module 54 may be incorporated into the overall controller for the ram air turbine or another controller associated with the aircraft. On the other hand, the module 54 may be a stand-alone control. A worker of ordinary skill in this art would be capable of developing appropriate programming for a module to perform these disclosed functions and operations.

By monitoring all of the associated conditions, real time health status of the ram air turbine system is provided.

Further, a failure prediction capability is developed which would be individual to the particular ram air turbine. This may allow the period between functional testing to be extended for some systems.

In addition, the module 54 provides a system and method for recording operational parameters. The overall gathered empirical data across a number of ram air turbine system will provide a better idea of the appropriate period between routine testing. In addition, the desired period between a system overhaul can be developed.

Finally, the system provides a way to view a ram air turbine speed independent of the aircraft. This could be useful during ground testing of the system and would relieve the aircraft operator from providing such information.

A method of testing a ram air turbine 20 includes the steps of causing a turbine having blades 26 to be rotated. The rotation of the turbine drives a power generation rotor 32. Operation of the ram air turbine is monitored by at least one of a temperature sensor, a vibration sensor, or a strain sensor. Sensed information is communicated to a module 54, with the module comparing sensed conditions to limits and identifying a potential condition of concern based upon said comparison.

Although an embodiment has been disclosed, a worker of ordinary skill in this art would recognize that certain modifications would come within the scope of this disclosure. For that reason, the following claims should be studied to determine the true scope and content of this disclosure.

The invention claimed is:

1. A method of testing a ram air turbine comprising the steps of:
   a) causing a turbine having blades to be rotated, and the rotation of said turbine operable to drive a power generation rotor;
   b) monitoring operation of the ram air turbine by a temperature sensor, a vibration sensor, and a strain sensor, and communicating sensed information to a module, with said module comparing said sensed information to limit and identifying a potential condition of concern based upon said comparison;
   c) sending a report should any of said sensed conditions exceed said limit, and said report being sent to at least one of a maintenance system and/or a display; and
   wherein said ram air turbine is provided with conditions during operation of an associated aircraft where it is brought into operation, and method steps a)-c) occurring during a test, and not when said conditions bring said ram air turbine into operation; and
   wherein said strain sensor is mounted in at least one of the following two locations, adjacent to an actuator for driving said ram air turbine between a deployed and stowed position, and associated with a door link mount for connecting said ram air turbine to a body of the associated aircraft.

2. The method as set forth in claim 1, wherein said sensors include thermocouples.

3. The method as set forth in claim 2, wherein said thermocouples are associated with a plurality of bearings mounting shafts within said ram air turbine.

4. The method as set forth in claim 3, wherein said plurality of bearings include at least one bearing mounting a turbine shaft and at least one bearing mounting an output shaft for rotating with said power generation rotor.

5. The method as set forth in claim 4, wherein at least one said thermocouple is positioned adjacent to a gear between said turbine shaft and said output shaft.

6. The method as set forth in claim 2, wherein said sensors further include at least one accelerometer for sensing a vibration level.

7. The method as set forth in claim 6, wherein said sensors include at least one strain gauge.

8. The method as set forth in claim 1, wherein said sensors further include at least one accelerometer for sensing a vibration level.

9. The method as set forth in claim 8, wherein said at least one accelerometer is associated with a connection for mounting said ram air turbine to an aircraft.

10. The method as set forth in claim 9, wherein said at least one accelerometer includes a second accelerometer associated with a location to monitor vibration of said turbine.

11. The method as set forth in claim 8, wherein said at least one accelerometer is associated with a location to monitor vibration of said turbine.

12. The method as set forth in claim 1, wherein said at least one strain sensor is mounted adjacent to said actuator for driving said ram air turbine between a deployed and stowed position.

13. The method as set forth in claim 1, wherein said at least one strain sensor is associated with said door link mount for connecting said ram air turbine to a body of the associated aircraft.

14. The method as set forth in claim 1, wherein said module storing said sensed conditions.

15. The method as set forth in claim 14, wherein the conditions stored at a plurality of said modules are utilized to develop a maintenance schedule for a ram air turbine.

* * * * *